US008707994B2

(12) United States Patent
Mizui

(10) Patent No.: US 8,707,994 B2
(45) Date of Patent: Apr. 29, 2014

(54) SOLENOID VALVE AND OIL PRESSURE CONTROL DEVICE

(75) Inventor: Hiroyuki Mizui, Obu (JP)

(73) Assignee: Denso Corporation, Kariya (JP)

( * ) Notice: Subject to any disclaimer, the term of this patent is extended or adjusted under 35 U.S.C. 154(b) by 42 days.

(21) Appl. No.: 13/426,649

(22) Filed: Mar. 22, 2012

(65) Prior Publication Data

US 2012/0291900 A1 Nov. 22, 2012

(30) Foreign Application Priority Data

May 16, 2011 (JP) ................................ 2011-109753

(51) Int. Cl.
*F16K 11/065* (2006.01)

(52) U.S. Cl.
USPC ........................................ 137/625.25; 251/48

(58) Field of Classification Search
USPC .................... 137/625.25, 625.65; 251/50, 48; 60/459, 461
See application file for complete search history.

(56) References Cited

U.S. PATENT DOCUMENTS

| | | | | |
|---|---|---|---|---|
| 3,490,337 | A * | 1/1970 | Hans-Christof | 91/32 |
| 4,971,116 | A * | 11/1990 | Suzuki et al. | 137/625.65 |
| 5,186,204 | A * | 2/1993 | Oka et al. | 137/238 |
| 5,259,414 | A * | 11/1993 | Suzuki | 137/625.65 |
| 5,535,783 | A * | 7/1996 | Asou et al. | 137/625.65 |
| 5,848,613 | A * | 12/1998 | Sakaguchi et al. | 137/625.65 |
| 5,868,167 | A * | 2/1999 | Miki et al. | 137/625.65 |
| 5,911,245 | A * | 6/1999 | Weber | 137/625.65 |
| 6,167,901 | B1 | 1/2001 | Yoshinura | |
| 6,688,334 | B2 * | 2/2004 | Kawamura et al. | 137/625.65 |
| 7,533,695 | B2 * | 5/2009 | Strauss et al. | 137/625.68 |
| 7,909,060 | B2 * | 3/2011 | Yamamoto et al. | 137/625.6 |
| 7,950,416 | B2 * | 5/2011 | Nakai et al. | 137/625.69 |
| 2003/0121486 | A1 * | 7/2003 | Komazawa et al. | 123/90.17 |
| 2004/0206076 | A1 * | 10/2004 | Morise et al. | 60/459 |
| 2006/0243938 | A1 | 11/2006 | Ishibashi et al. | |
| 2012/0138415 | A1 | 6/2012 | Yagi | |

FOREIGN PATENT DOCUMENTS

| | | |
|---|---|---|
| JP | 2001-330121 | 11/2001 |
| JP | 2006-307943 | 11/2006 |
| JP | 2009-058013 | 3/2009 |
| JP | 2009-115289 | 5/2009 |
| JP | 2009-236308 | 10/2009 |

OTHER PUBLICATIONS

Office Action (2 pages) dated May 7, 2013, issued in corresponding Japanese Application No. 2011-109753 and English translation (3 pages).

* cited by examiner

*Primary Examiner* — John Rivell
*Assistant Examiner* — Umashankar Ventkatesan
(74) *Attorney, Agent, or Firm* — Nixon & Vanderhye P.C.

(57) ABSTRACT

A solenoid valve has a linear solenoid, a common cylindrical sleeve, one axial end of which is fixed to the linear solenoid, and a common spool movably accommodated in the sleeve, and a return spring. The solenoid valve further has a first three-way valve formed by a first portion of the sleeve and a first portion of the spool for operating as a normally-closed type valve, and a second three-way valve formed by a second portion of the sleeve and a second portion of the spool for operating as a normally-opened type valve.

4 Claims, 3 Drawing Sheets

SOLENOID VALVE AND OIL PRESSURE CONTROL DEVICE

CROSS REFERENCE TO RELATED APPLICATION

This application is based on Japanese Patent Application No. 2011-109753 filed on May 16, 2011, the disclosure of which is incorporated herein by reference.

TECHNICAL FIELD

The present disclosure relates to a solenoid valve, which can be used as not only as a normally-closed type valve but also as a normally-opened type valve, and which is preferably applied to an automatic transmission apparatus for a vehicle.

BACKGROUND

An example of a solenoid valve, in which a spool valve and a linear solenoid are assembled together, will be explained with reference to FIGS. 2 and 3.

In the drawings, a normally-closed (N/C) type spool valve is also called as a first three-way valve A, while a normally-opened (N/O) type spool valve is also called as a second three-way valve B.

FIG. 2 shows a normally-closed type solenoid valve, which is composed of the first three-way valve A and the linear solenoid 6 for driving the first three-way valve A. This kind of solenoid valve is known in the art, for example, as disclosed in Japanese Patent No. 4,569,371.

According to the first three-way valve A, in a condition that a spool 3 is moved to a right-hand position by a biasing force of a return spring 4 when power supply to the linear solenoid 6 is cut off;

- a communication between a first input port A1 for receiving oil pressure from an oil-pressure generating source (not shown) and a first output port A2 is shut off; and
- a discharge port 10 is communicated to the first output port A2.

The first three-way valve A has a first F/B chamber A7 for pushing back the spool 3 in a right-hand direction, when output oil pressure (that is, oil pressure generated at the first output port A2) is increased.

When the output oil pressure is generated at the first output port A2, such output oil pressure is applied to a large-diameter portion (a first F/B land A5) of a left-hand side of the first F/B chamber A7 and to a large-diameter portion (a first input-port controlling land A4) of a right-hand side of the first F/B chamber A7. Then, a first F/B force is generated in the spool 3 in the right-hand direction depending on a difference of diameters (a difference of areas) of the respective large-diameter portions A5 and A4.

The output oil pressure is decided based on a balance among the following forces;

(i) a driving force of the linear solenoid 6 for driving the spool 3 in the left-hand direction;

(ii) a spring force of the return spring 4 for biasing the spool 3 in the right-hand direction; and (iii) the first F/B force for pushing the spool 3 in the right-hand direction.

FIG. 3 shows a normally-opened type solenoid valve, which is composed of the second three-way valve B and the linear solenoid 6 for driving the second three-way valve B. This kind of solenoid valve is known in the art, for example, as disclosed in Japanese Patent Publication No. 2009-115289.

According to the second three-way valve B, in the condition that the spool 3 is moved to the right-hand position by the biasing force of the return spring 4 when power supply to the linear solenoid 6 is cut off;

- a second input port B1 for receiving oil pressure from the oil-pressure generating source (not shown) and a second output port B2 are communicated to each other; and
- a communication between the second output port B2 and a discharge port 10 is shut off.

The second three-way valve B has a second F/B chamber B7 for pushing back the spool 3 in a left-hand direction, when output oil pressure (that is, oil pressure generated at the second output port B2) is increased.

When the output oil pressure is generated at the second output port B2, such output oil pressure is applied to a large-diameter portion (a second F/B land B5) of a right-hand side of the second F/B chamber B7 and to a large-diameter portion (a second input-port controlling land B4) of a left-hand side of the second F/B chamber B7. Then, a second F/B force is generated in the spool 3 in the left-hand direction depending on a difference of diameters (a difference of areas) of the respective large-diameter portions B5 and 34.

The output oil pressure is likewise decided based on a balance among the following forces;

(i) a driving force of the linear solenoid 6 for driving the spool 3 in the left-hand direction;

(ii) a spring force of the return spring 4 for biasing the spool 3 in the right-hand direction; and (iii) the second F/B force for pushing the spool 3 in the left-hand direction.

According to the prior arts, however, since the solenoid valve of the N/C type and the solenoid valve of the N/O type are separately formed from each other, those solenoid valves lack versatility.

SUMMARY OF THE DISCLOSURE

The present disclosure is made in view of the above points. It is an object of the present disclosure to provide a versatile solenoid valve, which can be used as a normally-closed type valve and as a normally-opened type valve. It is another object of the present disclosure to provide an oil pressure control device having a versatile solenoid valve.

According to a feature of the present disclosure (for example, as defined in the appended claim 1), a solenoid valve has a first three-way valve of a normally-closed type and a second three-way valve of a normally-opened type.

(i) It is, therefore, possible to use the solenoid valve as the N/C type valve by use of the first three-way valve when controlling the power supply to the linear solenoid.

(ii) It is also possible to use the solenoid valve as the N/O type valve by use of the second three-way valve when controlling the power supply to the linear solenoid.

As above, the solenoid valve of the present disclosure is a versatile valve, which can be used as either the N/C type valve or the N/O type valve.

According to another feature of the present disclosure (for example, as defined in the claim 2), the solenoid valve of the present disclosure has an oil-pressure switching member, which switches over an oil passage to either the first three-way valve or the second three-way valve, so as to supply the oil pressure to such selected valve.

The solenoid valve can be used either as the N/C type valve or the N/O type valve by the switching operation of the oil-pressure switching member.

According to a further feature of the present disclosure (for example, as defined in the claim 3), the first three-way valve has a first feedback chamber, while the second three-way valve has a second feedback chamber. In addition, the oil pressure control device has an assisting-oil-pressure supplying member provided for supplying oil pressure from an outside oil-pressure source to the first feedback chamber, when the second three-way valve is in operation so as to generate an assisting oil pressure therein.

In case of the solenoid valve being used as the N/C type valve, the first feedback force is generated in the first feedback chamber for pushing the spool in the right-hand direction.

In case of the solenoid valve being used as the N/O type valve, the second feedback force is generated in the second feedback chamber for pushing the spool in the left-hand direction.

(i) Therefore, in the case of the operation as the N/C type valve, the forces are balanced in the following manner:

"the driving force of the linear solenoid"="the first feedback force (in the right-hand direction)"+"the spring biasing force"

(ii) On the other hand, in the case of the operation as the N/O type valve, the forces are balanced in the following manner:

"the driving force of the linear solenoid"+"the second feedback force (in the left-hand direction)"="the spring biasing force"

The first feedback force is a force of pushing the spool in the right-hand direction, while the second feedback force is a force for pushing the spool in the left-hand direction. Therefore, the biasing force of the return spring cannot be formed as a common biasing force for both of the N/C type and N/O type valves. As a result, the biasing force of the return spring is set at such a low spring force, which is suited to the operation of the N/C type valve. Then, in case of the operation of the N/O type valve, the return spring lacks its biasing spring force.

According to the above feature (of the claim 3), as explained above, the oil pressure control device has the assisting-oil-pressure supplying member for supplying oil pressure to the first feedback chamber, when the second three-way valve is in operation so as to generate the assisting oil pressure therein.

Since the assisting oil pressure is generated in the first feedback chamber when the solenoid valve is operated as the N/O type valve, an assisting force is applied to the spool in the right-hand direction. The assisting force can make up for defection of the spring force of the return spring.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
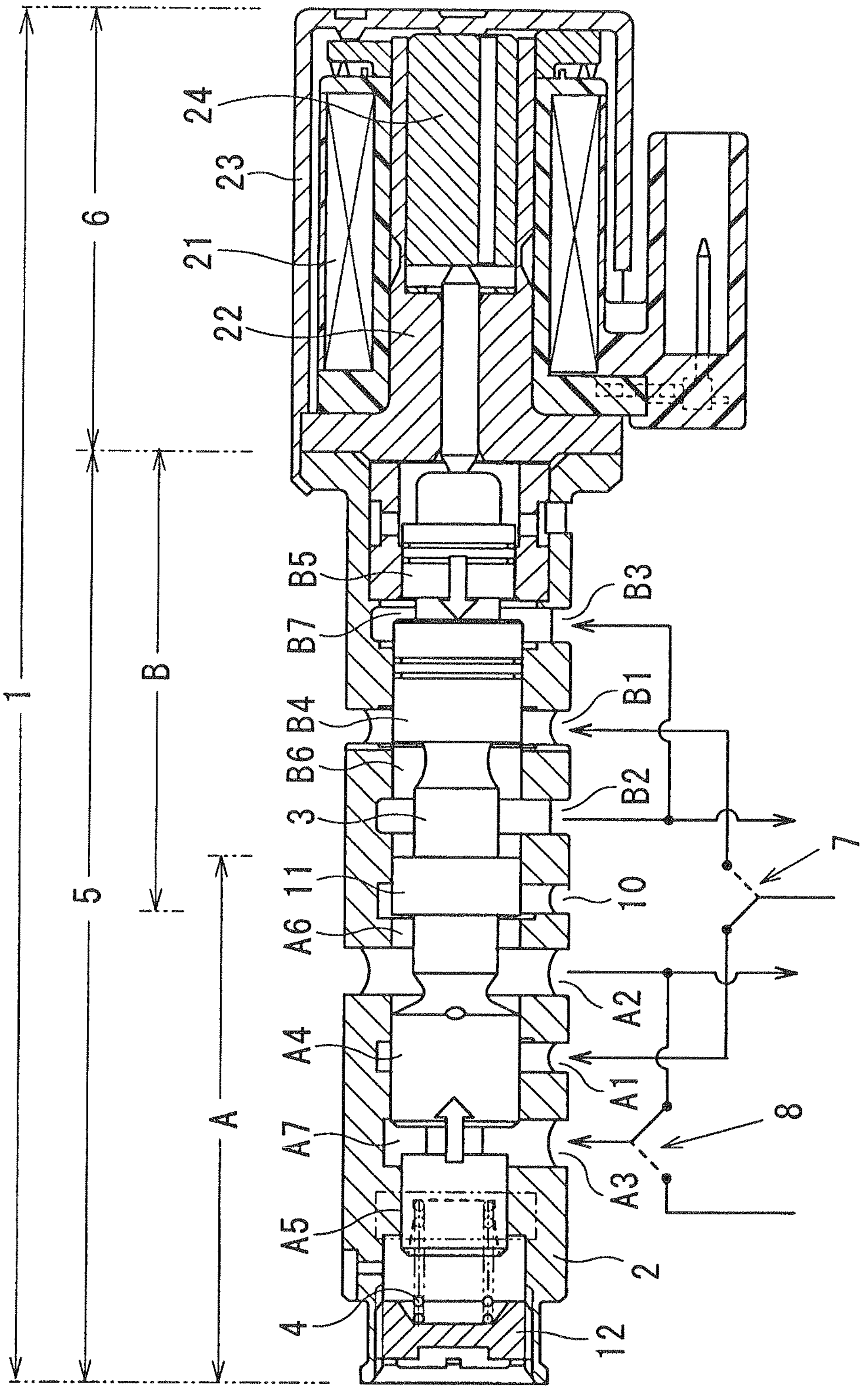
FIG. 1 is a schematic cross sectional view showing a solenoid valve, which can be used as not only a normally-closed type valve but also a normally-opened type valve according to an embodiment of the present disclosure.
Figure 2:
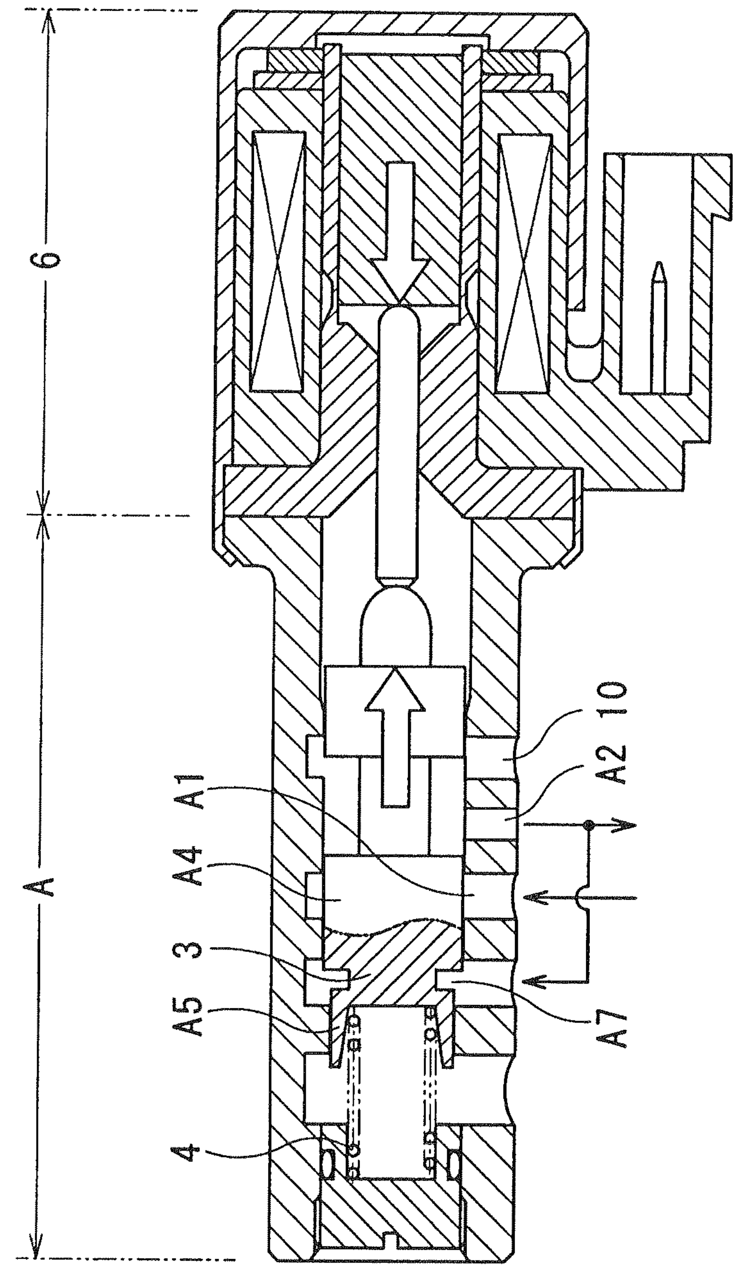
FIG. 2 PRIOR ART
FIG. 2 is a schematic cross sectional view showing a solenoid valve of a normally-closed type according to a prior art.
Figure 3:
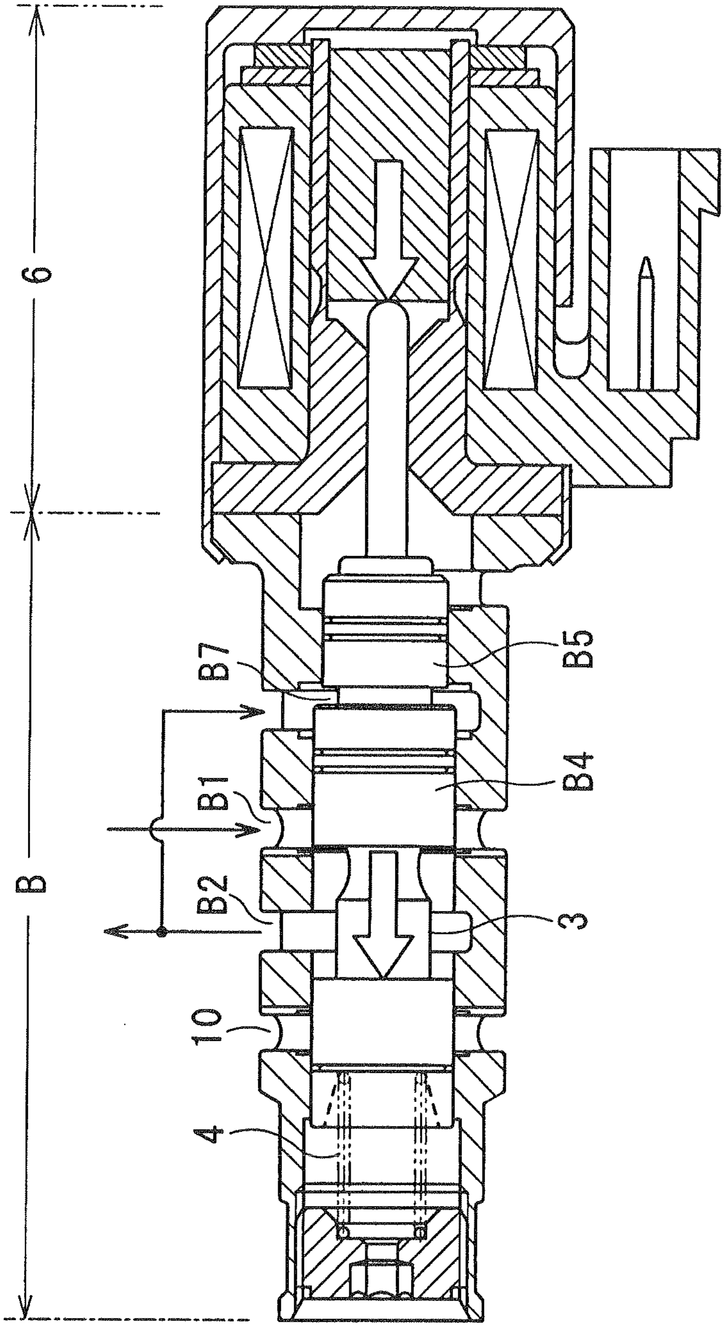
FIG. 3 PRIOR ART
FIG. 3 is a schematic cross sectional view showing a solenoid valve of a normally-opened type according to another prior art.

An embodiment of the present disclosure will be explained with reference to the drawing. However, the present disclosure should not be limited to the embodiment.

A solenoid valve 1 is applied to an oil pressure control device for an automatic transmission apparatus of a vehicle. The solenoid valve 1 has a spool valve 5 for controlling oil pressure for the transmission apparatus and a linear solenoid 6 for driving the spool valve 5.

The spool valve 5 is composed of; a (common) cylindrical sleeve 2; a (common) spool 3 movably accommodated in the cylindrical sleeve 2 so that it reciprocates in its axial direction; and a return spring 4 for biasing the spool 3 in one axial direction (in a right-hand direction toward to the linear solenoid 6).

The linear solenoid 6 is fixed to one axial end (a right-hand end) of the sleeve 2 so as to move the spool 3 in a direction to the other axial end (a left-hand end) of the sleeve 2 in accordance with power supply to the linear solenoid 6.

A normally-closed three-way valve A (hereinafter also referred to as a N/C type valve A or a first three-way valve A) is provided on a left-hand side of the spool valve 5. A normally-opened three-way valve B (hereinafter also referred to as a N/O type valve B or a second three-way valve B) is provided on a right-hand side of the spool valve 5.

The first three-way valve A, which is provided on the left-hand side of the spool valve 5, will be explained more in detail.

The sleeve 2 of the first three-way valve A (a left-hand portion or a first portion of the sleeve 2) has;

- a first input port A1 for receiving input oil pressure;
- a first output port A2 to be communicated to a control apparatus (for example, a friction-engagement device of the automatic transmission apparatus), to which controlled output oil pressure is supplied via an oil passage (not shown);
- a discharge port 10 communicated to a low pressure chamber (for example, an oil pan (not shown)); and
- a first feedback (F/B) port A3 operatively communicated with the first output port A2.

According to the present embodiment, the discharge port 10 is commonly provided for both of the first three-way valve A and the second three-way valve B.

The above ports are arranged in the following order from the left-hand end of the sleeve 2 toward a middle (center) portion thereof; namely, the first F/B port A3, the first input port A1, the first output port A2 and the discharge port 10.

The spool 3 of the first three-way valve A (i.e. a left-hand portion or a first portion of the spool 3) has;

- a first input-port controlling land A4 for controlling an opening degree of the first input port A1;
- a discharge-port controlling land 11 for controlling an opening degree of the discharge port 10; and
- a first feedback (F/B) land A5 having an outer diameter smaller than that of the first input-port controlling land A4.

According to the present embodiment, the discharge-port land 11 is commonly provided not only for the first three-way valve A but also for the second three-way valve B.

The above lands are arranged in the following order form the left-hand end of the spool 3 to a center thereof; namely, the first F/B land A5, the first input-port controlling land A4, and the discharge-port controlling land 11.

A first distribution chamber A6, which is communicated to the first output port A2, is formed between the first input-port controlling land A4 and the discharge-port controlling land 11 (that is, a circumferential space around a small-diameter portion of the spool 3). A first feedback (F/B) chamber A7 is formed between the first input-port controlling land A4 and the first F/B land A5 (that is, another circumferential space around another small-diameter portion of the spool 3).

A positional relationship of the first input port A1 and the first input-port controlling land A4 as well as a positional relationship of the discharge port 10 and the discharge-port controlling land 11 is so set that the first three-way valve A is formed as the normally-closed (N/C) type valve.

More exactly, the above positional relationships are defined as below:

(i) In a condition that the spool 3 is moved in the right-hand direction by the biasing force of the return spring 4 and kept in such right-hand position (that is, a condition that the power supply to the linear solenoid 6 is cut off);

the first input-port controlling land A4 closes the first input port A1, and the discharge-port controlling land 11 opens the discharge port 10 (the discharge port 10 is communicated to the first output port A2).

As a result, the first output port A2 is communicated only to the discharge port 10. In other words, an output oil pressure is not generated at the first output port A2.

(ii) In a condition that the spool 3 is slightly moved in the left-hand direction by the driving force of the linear solenoid 6;

the first input-port controlling land A4 opens the first input port A1, and the discharge-port controlling land 11 continuously opens the discharge port 10.

As a result, the first output port A2 is communicated to both of the first input port A1 and the discharge port 10. In other words, communication degrees are changed depending on a moved position of the spool 3, and thereby the output oil pressure is generated at the first output port A2 depending on the position of the spool 3.

(iii) In a condition that the spool 3 is largely moved in the left-hand direction against the biasing force of the return spring 4 (that is, a condition that the driving force of the linear solenoid 6 is very large);

the first input-port controlling land A4 continuously opens the first input port A1, and the discharge-port controlling land 11 closes the discharge port 10.

As a result, the first output port A2 is communicated only to the first input port A1. In other words, a maximum output oil pressure is generated at the first output port A2.

As explained above, the outer diameter of the first F/B land A5 is made smaller than that of the first input-port controlling land A4. When the oil pressure applied to the first F/B chamber A7 is increased, an axial fluid pressure (a first F/B force) is generated at the spool 3 in the right-hand direction against the driving force of the linear solenoid 6, depending on a land difference (a difference of the outer diameter) between the first input-port controlling land A4 and the first F/B land A5. A displacement of the spool 3 in the axial direction is thereby stabilized to suppress variation of the output oil pressure at the first output port A2.

The second three-way valve B, which is provided on the right-hand side of the spool valve 5, will be explained more in detail.

The sleeve 2 of the second three-way valve B (a right-hand portion or a second portion of the sleeve 2) has;

a second input port 31 for receiving the input oil pressure;

a second output port 32 to be communicated to the control apparatus (for example, the friction-engagement device of the automatic transmission apparatus), to which the controlled output oil pressure is supplied via an oil passage (not shown);

the discharge port 10 communicated to the low pressure chamber (for example, the oil pan (not shown)); and a second feedback (F/B) port B3 communicated with the second output port B2.

As explained above, according to the present embodiment, the discharge port 10 is commonly provided for both of the first three-way valve A and the second three-way valve B. The above ports are arranged in the following order from the center of the sleeve 2 toward the right-hand end thereof; namely, the discharge port 10, the second output port B2, the second input port B1, and the second F/B port B3.

The spool 3 of the second three-way valve B (the right-hand portion or a second portion of the spool 3) has;

a second input-port controlling land B4 for controlling an opening degree of the second input port B1;

the discharge-port controlling land 11 for controlling the opening degree of the discharge port 10; and a second feedback (F/B) land B5 having an outer diameter smaller than that of the second input-port controlling land B4.

As explained above, according to the present embodiment, the discharge-port land 11 is commonly provided not only for the first three-way valve A but also for the second three-way valve B.

The above lands are arranged in the following order form the center of the spool 3 to the right-hand end thereof; namely, the discharge-port controlling land 11, the second input-port controlling land B4, and the second F/B land B5.

A second distribution chamber B6, which is communicated to the second output port B2, is formed between the second input-port controlling land B4 and the discharge-port controlling land 11 (that is, a circumferential space around a small-diameter portion of the spool 3). A second feedback F/B chamber B7 is formed between the second input-port controlling land B4 and the second F/B land B5 (that is, another circumferential space around another small-diameter portion of the spool 3).

A positional relationship of the second input port B1 and the second input-port controlling land B4 as well as the positional relationship of the discharge port 10 and the discharge-port controlling land 11 is so set that the second three-way valve B is formed as the normally-opened (N/O) type valve.

More exactly, the above positional relationships are defined as below:

(i) In the condition that the spool 3 is moved in the right-hand direction by the biasing force of the return spring 4 and kept in such right-hand position (that is, the condition that the power supply to the linear solenoid 6 is cut off);

the second input-port controlling land B4 opens the second input port B1, and the discharge-port controlling land 11 closes the discharge port 10 (the communication between the discharge port 10 and the second output port B2 is shut off).

As a result, the second output port B2 is communicated only to the second input port B1. In other words, a maximum output oil pressure is generated at the second output port B2.

(ii) In the condition that the spool 3 is slightly moved in the left-hand direction by the driving force of the linear solenoid 6;

the second input-port controlling land B4 continuously opens the second input port B1, and the discharge-port controlling land 11 opens the discharge port 10 (the discharge port 10 is communicated to the second output port B2).

As a result, the second output port B2 is communicated to both of the second input port B1 and the discharge port 10. In other words, communication degrees are changed depending on the moved position of the spool 3, and thereby an output oil pressure is generated at the second output port B2 depending on the position of the spool 3.

(iii) In the condition that the spool 3 is largely moved in the left-hand direction against the biasing force of the return spring 4 (that is, the condition that the driving force of the linear solenoid 6 is very large);

the second input-port controlling land B4 closes the second input port B1, and the discharge-port controlling land 11 continuously opens the discharge port 10.

As a result, the second output port B2 is communicated only to the discharge port 10. In other words, no output oil pressure is generated at the second output port B2.

As explained above, the outer diameter of the second F/B land B5 is made smaller than that of the second input-port controlling land B4. When the oil pressure applied to the second F/B chamber B7 (equal to the output oil pressure at the second output port B2) is increased, an axial fluid pressure (a second F/B force) is generated at the spool 3 in the left-hand direction against the biasing force of the return spring 4, depending on a land difference (a difference of the outer diameter) between the second input-port controlling land B4 and the second F/B land B5. The displacement of the spool 3 in the axial direction is thereby stabilized to suppress variation of the output oil pressure at the second output port B2.

The return spring 4 is a compression coil spring formed in a spiral shape for biasing the spool 3 in the right-hand direction.

An adjusting screw 12 is attached at the left-hand end of the sleeve 2. The return spring 4 is provided in a spring chamber between the adjusting screw 12 and the spool 3 in a compressed condition. The biasing force (a spring load) of the return spring 4 is adjusted by a screwed amount of the adjusting screw 12.

The linear solenoid 6 is a driving member for driving the spool 3 in the left-hand direction by an electromagnetic force generated by the power supply thereto. The linear solenoid 6 is composed of a coil 21 for generating the electromagnetic force, a fixed magnetic circuit (a stator 22 and a yoke 23), a plunger 24 movable depending on the magnetic force generated at the coil 21 so as to drive the spool 3 in the left-hand direction.

The cross sectional structure of the linear solenoid 6 shown in FIG. 1 is an example. The present disclosure should not be limited to the structure of FIG. 1.

An operation of the linear solenoid 6 is controlled by an electronic control unit (AT-ECU: not shown). The control unit (AT-ECU) controls a duty ratio of the driving current to be supplied to the linear solenoid 6. When the power supply to the linear solenoid 6 is controlled, the output oil pressures at the first and second output ports A2 and B2 are controlled.

(i) When the first three-way valve A is used (that is, when the solenoid valve 1 is used as the N/C type valve), the spool 3 is balanced so as to be:

"the driving force of the linear solenoid"="the first F/B force (in the right-hand direction)"+"the spring biasing force"

(ii) When the second three-way valve B is used (that is, when the solenoid valve 1 is used as the N/O type valve), the spool 3 is balanced so as to be:

"the driving force of the linear solenoid"+"the second F/B force (in the left-hand direction)"="the spring biasing force"

The solenoid valve 1 has an oil-pressure switching member 7, which switches an oil passage to either one of the first and second three-way valves A and B, so as to supply oil pressure to such selected valve A or B. The solenoid valve 1 further has an assisting-oil-pressure supplying member 8, for supplying oil pressure to the first F/B chamber 7A when the second three-way valve B is operated (that is, when the solenoid valve 1 is used as the N/O type valve).

The oil-pressure switching member 7 supplies the oil pressure from an oil-pressure generating source (for example, an oil pump and a regulator) to either the first input port A1 or the second input port B1.

When the solenoid valve 1 is used as the N/C type valve, the oil pressure from the oil-pressure generating source is supplied to the first input port A1 by the oil-pressure switching member 7.

On the other hand, when the solenoid valve 1 is used as the N/O type valve, the oil pressure from the oil-pressure generating source is supplied to the second input port B1 by the oil-pressure switching member 7.

The assisting-oil-pressure supplying member 8 switches over its oil passage either to the first output port A2 or to an assisting-oil-pressure generating source (for example, the above oil pump and the regulator).

When the solenoid valve 1 is used as the N/C type valve, the oil pressure from the first output port A2 is supplied to the first F/B chamber A7 by the assisting-oil-pressure supplying member 8.

On the other hand, when the solenoid valve 1 is used as the N/O type valve, the oil pressure from the assisting-oil-pressure generating source is supplied to the first F/B chamber A7 by the assisting-oil-pressure supplying member 8.

The present embodiment has the following advantages:

(AD-1) The solenoid valve 1 of the present embodiment has the first three-way valve A as the N/C type valve and the second three-way valve B as the N/O type valve.

(i) It is, therefore, possible to use the solenoid valve 1 as the N/C type valve by use of the first three-way valve A when controlling the power supply to the linear solenoid 6.

(ii) It is also possible to use the solenoid valve 1 as the N/O type valve by use of the second three-way valve B when controlling the power supply to the linear solenoid 6.

As above, the solenoid valve 1 of the present embodiment is a versatile valve, which can be used as either the N/C type valve or the N/O type valve.

(AD-2) The solenoid valve 1 of the present embodiment has the oil-pressure switching member 7, which switches over the oil passage to either the first three-way valve A (more exactly, to the first input port A1) or the second three-way valve B (the second input port B1), so as to supply the oil pressure to such selected valve A or B.

The solenoid valve 1 can be used either as the N/C type valve or the N/O type valve by the switching operation of the oil-pressure switching member 7.

(AD-3) According to the oil pressure control device of the present embodiment, the assisting-oil-pressure is applied to the first F/B chamber A7 by the assisting-oil-pressure supplying member 8, when the second three-way valve B is used (that is, when the solenoid valve 1 is used as the N/O type valve).

As a result that the assisting-oil-pressure is applied to the first F/B chamber A7, an assisting force is generated in the spool 3 in the right-hand direction. The assisting force can make up for defection of the spring force of the return spring 4, when the solenoid valve is used as the N/O type valve.

As a result of generating the assisting force, when the solenoid valve 1 is used as the N/O type valve, the solenoid valve 1 is balanced so as to be:

"the driving force of the linear solenoid"+"the second F/B force (in the left-hand direction)"="the spring biasing force"+"the assisting force"

In the above embodiment, the solenoid valve is applied to the oil pressure control device for the automatic transmission apparatus of the vehicle. However, the present disclosure can be applied to any other solenoid valves than the automatic transmission apparatus.

What is claimed is:

1. A solenoid valve comprising:

a linear solenoid;

a common cylindrical sleeve, one axial end of which is fixed to the linear solenoid;

a common spool movably accommodated in the sleeve and moved in its axial direction by an operation of the linear solenoid when electric power is supplied thereto;

a return spring provided in the sleeve between the other axial end thereof and the spool for biasing the spool in a direction to the one axial end of the sleeve;

a first three-way valve formed by a first portion of the sleeve and a first portion of the spool for operating as a normally-closed type valve; and a second three-way valve formed by a second portion of the sleeve and a second portion of the spool for operating as a normally-opened type valve, wherein the first three-way valve comprises:

a first feedback land, a first input-port controlling land and a discharge-port controlling land, each of which is formed in the first portion of the spool and arranged in this order from a spring-side end of the spool toward a middle portion thereof, wherein the first feedback land and the first input-port controlling land are connected to each other by a small-diameter portion of the first portion of the spool; and a first feedback port, a first input port, a first output port and a discharge port, each of which is formed in the first portion of the sleeve and arranged in this order from the other axial end of the sleeve toward a middle portion thereof; and wherein the second three-way valve comprises:

a discharge-port controlling land, a second input-port controlling land and a second feedback land, each of which is formed in the second portion of the spool and arranged in this order from the middle portion of the spool toward a solenoid-side end of the spool, wherein the second input-port controlling land and the second feedback land are connected to each other by a small-diameter portion of the second portion of the spool; and a discharge port, a second output port, a second input port and a second feedback port, each of which is formed in the second portion of the sleeve and arranged in this order from the middle portion of the sleeve toward the one axial end thereof, wherein the discharge-port controlling land of the first three-way valve and the discharge-port controlling land of the second three-way valve are formed as one common land, and wherein the discharge port of the first three-way valve and the discharge port of the second three-way valve are formed as one common port.

2. The solenoid valve according to the claim 1, wherein a first feedback chamber is formed in the sleeve between the first feedback land and the first input-port controlling land, wherein an outer diameter of the first feedback land is smaller than that of the first input-port controlling land, and a second feedback chamber is formed in the sleeve between the second input-port controlling land and the second feedback land, wherein an outer diameter of the second feedback land is smaller than that of the second input-port controlling land.

3. An oil pressure control device comprising:

the solenoid valve of the claim 2;

a first oil passage connected to the first input port of the solenoid valve;

a second oil passage connected to the second input port of the solenoid valve; and an oil-pressure switching member for switching over the oil passage to either one of the first and second three-way valves, so as to supply oil pressure to such selected valve.

4. The oil pressure control device according to the claim 3, wherein the first feedback chamber pushes the spool in the one axial direction in accordance with pressure increase of an output oil pressure of the first three-way valve, the second feedback chamber pushes the spool in the other axial direction in accordance with pressure increase of an output oil pressure of the second three-way valve, and an assisting-oil-pressure supplying member is further provided for supplying oil pressure from an outside oil-pressure source to the first feedback chamber, when the second three-way valve is in operation so as to generate an assisting oil pressure therein in the one axial direction.

* * * * *